United States Patent
Lu et al.

(10) Patent No.: US 9,845,145 B2
(45) Date of Patent: Dec. 19, 2017

(54) METHOD AND SYSTEM FOR MODEL BASED CONTROL FOR VARIABLE PITCH FAN ENGINES AND TURBO-SHAFT, TURBO-PROPELLER ENGINES

(71) Applicant: General Electric Company, Schenectady, NY (US)

(72) Inventors: Manxue Lu, Swampscott, MA (US); R. Sheldon Carpenter, Hamilton, OH (US)

(73) Assignee: General Electric Company, Schenectady, NY (US)

(*) Notice: Subject to any disclaimer, the term of this patent is extended or adjusted under 35 U.S.C. 154(b) by 572 days.

(21) Appl. No.: 14/830,914

(22) Filed: Aug. 20, 2015

(65) Prior Publication Data
US 2016/0159461 A1 Jun. 9, 2016

Related U.S. Application Data
(60) Provisional application No. 62/057,595, filed on Sep. 30, 2014.

(51) Int. Cl.
*B64C 11/30* (2006.01)
*F02C 9/58* (2006.01)
(Continued)

(52) U.S. Cl.
CPC ............ *B64C 11/305* (2013.01); *B64D 27/10* (2013.01); *F02C 9/58* (2013.01);
(Continued)

(58) Field of Classification Search
CPC ...... B64C 11/305; F02C 9/58; F05D 2270/02; F05D 2270/053; F05D 2270/13
See application file for complete search history.

(56) References Cited

U.S. PATENT DOCUMENTS 4,648,797 A * 3/1987 Martin ...................... F02C 9/28
416/27
4,958,289 A * 9/1990 Sum ...................... B64C 11/305
416/27
(Continued)

OTHER PUBLICATIONS

European Search Report and Opinion issued in connection with corresponding EP Application No. 15187117.5 on Feb. 23, 2016.

*Primary Examiner* — Ninh H Nguyen
(74) *Attorney, Agent, or Firm* — General Electric Company; Pamela A. Kachur

(57) ABSTRACT

A method and control system for an aircraft engine comprising a gas turbine driving a fan propeller with a mechanical gear-train and a dedicated pitch change mechanism for the fan propeller includes a fuel flow signal input; a pitch change mechanism signal input; a controlled plant for relating a pitch change mechanism pitch angle (BetaP) and a fuel flow (Wf) to at least two controlled outputs and a set of constraints. A decoupling control decoupling the controlled plant and/or the constraints into two separate single-input single-output (SISO) control loops for the first and second controlled outputs and a decoupling control decoupling the constraints from the decoupled controlled outputs and the constraints from one another provide gas turbine and fan propeller coordinate control while coordinately controlling constraints and outputs. A feedforward control can compensate the load change effect on engine speed and fan propeller rotor speed control.

13 Claims, 7 Drawing Sheets

(51) Int. Cl.
*B64D 27/10* (2006.01)
*B64D 27/00* (2006.01)

(52) U.S. Cl.
CPC .... *B64D 2027/005* (2013.01); *F05D 2270/13* (2013.01); *Y02T 50/66* (2013.01)

(56) References Cited

U.S. PATENT DOCUMENTS

| | | |
|---|---|---|
| 8,689,539 B2 | 4/2014 | Lu et al. |
| 9,081,378 B2 | 7/2015 | Lu et al. |
| 2013/0202434 A1 | 8/2013 | Lu et al. |

\* cited by examiner

Feed-forward Control Action 1

Feed-forward Control Action 2

METHOD AND SYSTEM FOR MODEL BASED CONTROL FOR VARIABLE PITCH FAN ENGINES AND TURBO-SHAFT, TURBO-PROPELLER ENGINES

CROSS-REFERENCE TO RELATED APPLICATIONS

This non-provisional application claims the benefit of priority under 35 U.S.C. §119(e) to U.S. Provisional Patent Application No. 62/057,595, entitled "METHOD AND SYSTEM FOR MODEL BASED CONTROL FOR VARIABLE PITCH FAN ENGINES AND TURBO-SHAFT, TURBO-PROPELLER ENGINES", filed Sep. 30, 2014, which is herein incorporated in its entirety by reference.

BACKGROUND

The current disclosure pertains to a control system for variable pitch fan engines and turbo-shaft, turbo-propeller engines.

In some fan engines (also known as "propfan" engines), the axis of the fan propeller is parallel to or coaxial with the axis of the gas engine. Typically, in a turbo-shaft, turbo-propeller engine, the axis of one or more propellers will be perpendicular to the axis of the gas engine. In both configurations, the fan or propeller may have a fixed pitch or a variable pitch. If the pitch is variable, the engine may also have a dedicated pitch change mechanism (PCM). The propeller speed (Nr) is proportional to the gas engine power turbine shaft speed (N1) via a pure mechanical gear-train transformation, that is, Nr=Kgb*N1 where Kgb is a constant that represents the gear ratio. Controlling the fan or propeller speed, Nr, is equivalent to controlling the power turbine speed. Generally, the thrust is scheduled to be a function of propeller speed Nr, and also a function of either gas engine high pressure (HP) turbine shaft speed (N2) or engine pressure ratio (EPR). The primary challenge is to coordinate primary control of the propeller speed (Nr), the HP turbine shaft speed (N1), and any PCM pitch angle while maintaining a set of active constraints including but not limited to core pressure (Px), exhaust temperature (T), core speed rate (N2dot), and/or torque (Tq) to stay with defined limits, including but not limited to load change while rejecting external disturbances and/or internal known disturbances including but not limited to variable bleed valves and variable stator vanes.

There remains a need for a systematic control method and a complete control system for a variable pitch fan engine or a turbo-shaft, turbo propeller engine that controls the fan or propeller and the engine coordinately while accommodating the active constraints.

BRIEF DESCRIPTION OF THE INVENTION

In one aspect, an embodiment relates to a control system for an aircraft engine comprising a gas turbine driving a fan propeller with a mechanical gear-train and a dedicated pitch change mechanism for the fan propeller. The control system comprises: a fuel flow signal input; and a pitch change mechanism signal input; a controlled plant for relating a pitch change mechanism pitch angle (BetaP) from the pitch change mechanism signal input and a fuel flow (Wf) fuel flow signal input to at least two controlled outputs and at least one constraint and at least one known internal disturbance input; a decoupling control for decoupling the controlled plant into two separate single-input single-output (SISO) control loops for the first and second controlled outputs and a decoupling control for decoupling the constraints from the decoupled controlled outputs and the constraints from one another such that each of constraints is separated into a SISO control loop. The first one of the controlled outputs is either propeller speed (Nr) or power turbine shaft speed (N1) and a second one of the controlled outputs is engine core speed (N2), engine pressure ratio (EPR) or engine torque (Tq). The constraints may be core speed rate (N2dot), core pressure (Px), exhaust temperature (T) and engine torque (Tq).

In another aspect, an embodiment relates to a method of controlling an aircraft engine comprising a gas turbine driving a fan propeller with mechanical gear-train, a fuel actuator, a pitch change mechanism actuator. The method comprises: receiving a fuel flow signal; receiving a pitch change mechanism signal; relating in a controlled plant a pitch change mechanism pitch angle (BetaP) from the pitch change mechanism signal and a fuel flow (Wf) fuel flow signal to at least two controlled outputs; decoupling the controlled plant into two separate single-input single-output (SISO) control loops for the first and second controlled outputs; and decoupling the constraints from the decoupled controlled outputs and the constraints from one another such that each of constraints is separated into a SISO control loop. A first one of the controlled outputs is either propeller speed (Nr) or power turbine shaft speed (N1) and a second one of the controlled outputs is engine core speed (N2), engine pressure ratio (EPR) or engine torque (Tq). The constraints may be core speed rate (N2dot), core pressure (Px), exhaust temperature (T) and engine torque (Tq).

BRIEF DESCRIPTION OF THE FIGURES

The technology described herein may be best understood by reference to the following description taken in conjunction with the accompanying drawing figures in which.

DETAILED DESCRIPTION

The current disclosure provides a control system where the fan or propeller (fan propeller) and the gas engine are treated as a single controlled plant. The control system architecture includes all outputs and constraints to be controlled, considers known disturbances rejection and is robust to drastic changes in the references. It follows that the current disclosure provides a complete, systematic but simple method and system as a holistic and separatable solution for the control of variable pitch fan engines and turbo-shaft, turbo propeller engines, whether ducted or unducted.

Figure 1A:
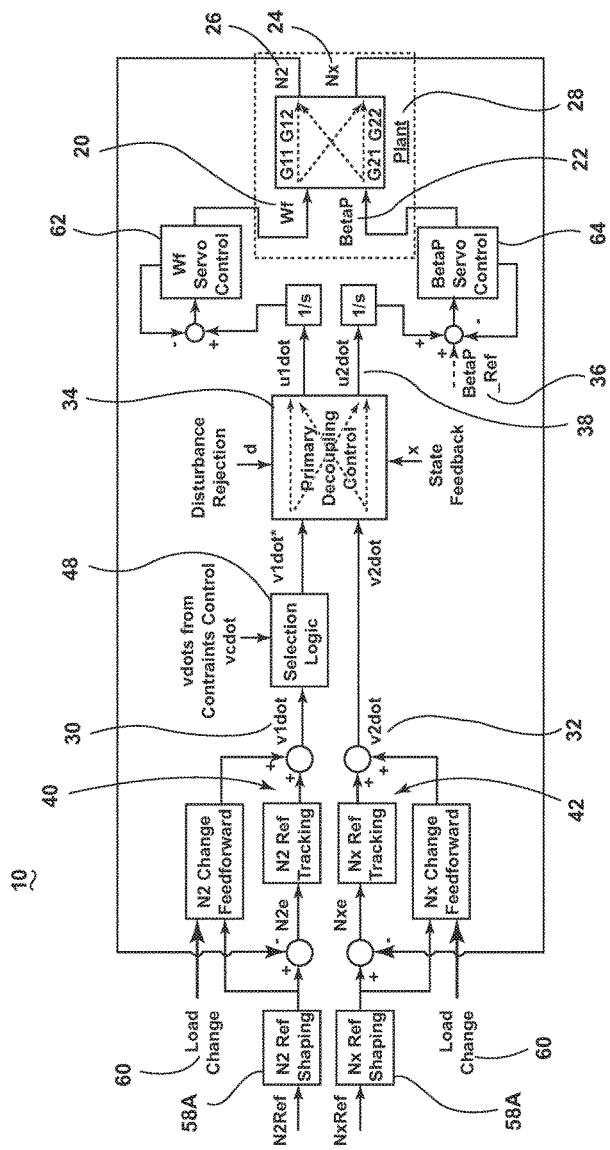
FIG. 1A is a block diagram representation of a primary control architecture for an variable pitch fan engine or a turbo shaft turboprop engine for an aircraft in flight.
Figure 1B:
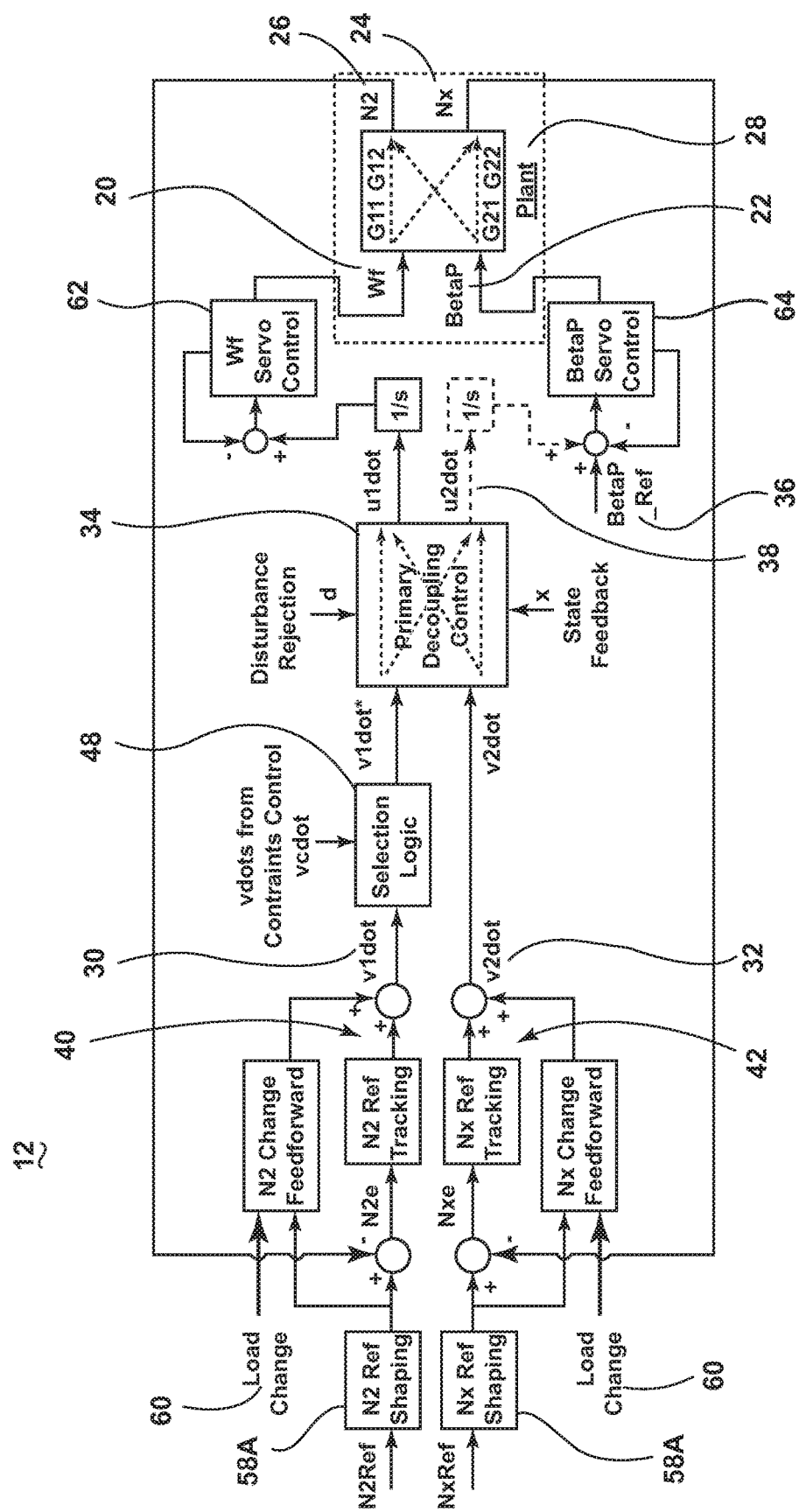
FIG. 1B is a block diagram representation of a primary control architecture for a variable pitch fan engine or a turbo shaft turboprop engine either in thrust reverse or for an aircraft on ground.

The basic control system architecture for an embodiment of a variable pitch fan engine or turbo-shaft, turbo-propeller engine is presented in FIGS. 1A and 1B. FIG. 1A presents a control system 10 for an aircraft in flight and FIG. 1B presents a control system architecture 12 for an aircraft on the ground or in thrust reverse.

The control inputs are fuel flow (Wf) 20 from the fuel actuator (integrated into the fuel flow servo control 62) and PCM pitch angle (BetaP) 22 from the PCM actuator (integrated into the PCM pitch angle servo control 64). The other variable geometries (VG) are considered as known disturbance inputs. One of the controlled outputs, 24 may be either the propeller speed (Nr) or the power turbine shaft speed (N1) based on the relationship Nr=Kgb*N1 and denoted as Nx. A second controlled output, 26 may be any of the engine core speed (N2), engine pressure ratio (EPR) and engine torque (Tq). For clarity and brevity, the controlled outputs, 24, 26 presented herein for the following formulation are Nx (first controlled output 24) and N2 (second controlled output 26). Typical constraints for the control methodology may include minimum and maximum limits such as, but not limited to: minimum pressure limit (MinPx), maximum pressure limit (MaxPx), maximum temperature limit (MaxT), maximum torque limit (MaxTq), minimum speed rate limit (MinN2dot), and maximum speed rate limit (MaxN2dot).

The controlled outputs 24, 26 N2 and Nx form the basis of feedback loops in the control system architectures 10, 12. These feedback signals are combined with shaped (or filtered references) denoted as N2Ref and NxRef. The combination of the feedback signals and the shaped references N2Ref and NxRef form tracking error signals. The tracking error signals may go through reference tracking SISO controls then be combined with feedforward control actions that result from accounting for the effects of aerodynamic loading changes on the controlled outputs 24, 26 Nx and N2. The combination of the reference tracking SISO control outputs and the feedforward controls forms the pseudo-inputs $\dot{v}$ 30, 32. Application of selection logic 48 for selecting the most demanding input from the pseudo-inputs results from constraint decoupling control and a controlled output tracking control. The pseudo-inputs resulting from constraint decoupling control may replace at least one of the pseudo inputs 30, 32 and form the inputs for the primary decoupling control 34. The output of the primary decoupling control forms the basis of the control input commands. The control input commands feed the fuel flow servo control 62 and the PCM pitch angle servo control 64 along with the controlled plant 28 that generates the controlled outputs 24, 26 and controlled constraints 50.

A controlled plant 28 comprises functional elements that describe the relationships between integrators, actuators and engine dynamics. According to the system presented herein, elements of the actuators may include first or second order transfer functions. Without loss of generality, the actuators may be considered as first order lag devices in the formulation presented herein. It follows that the control system states comprise the engine dynamic states, the actuator states and the integrator states.

The controlled plant 28, that is, the controlled portion or process of the control system 10, 12, includes the states (x), the control inputs (u), the disturbance inputs (d), the outputs (y) and the constraints ($y_c$) according to $x = [N_2 \, N_x \, Wf \, \beta_p \, Wf_l \, \beta_{pl}]^T$, $\dot{u} = [\dot{W}_f \, \dot{\beta}_p]^T$, $d = [VG_1 \, VG_2 \, VG_3 \, VG_4 \, VG_5]^T$, $y = [N_2 \, N_x]^T$, and $y_c = [P_x \, T \, T_q \, Ndot]^T$.

Assume the original controlled plant 28 is represented with the following equations:

$$x_{k+1} = f(x_k, \dot{u}_k, d_k) \quad \text{(Eq. 1a)}$$

$$y_k = h(x_k, \dot{u}_k, d_k) \quad \text{(Eq. 1b)}$$

$$y_{c,k} = h_c(x_k, \dot{u}_k, d_k) \quad \text{(Eq. 1c)}$$

At sample k, the system states, $x_k$, the inputs $\dot{u}_{k-1}$, the disturbances $d_k$ and the outputs $y_k^- = h(x_k, \dot{u}_{k-1}, d_k)$ are known. Thus, the deviation variables are expressed about the current operating condition.

Define the deviation variables from the conditions:

$$\tilde{x}_j = x_j - x_k, \tilde{\dot{u}}_j = \dot{u}_j - \dot{u}_{k-1}, \tilde{d}_j = d_j - d_k, \tilde{y}_j = y_j - y_k^-, \text{ and } \tilde{y}_{c,j} = y_{c,j} - y_{c,k}^-$$

The local linearized model of the system, in terms of deviation variables, may be derived as:

$$x_{k+1} - x_k = \tilde{x}_{k+1}$$

$$= f(x_k, \dot{u}_{k-1}, d_k) - x_k + \frac{\partial f}{\partial x}\bigg|_{k,k}(x_k - x_k)$$

$$+ \frac{\partial f}{\partial u}\bigg|_{k,k-1}(\dot{u}_k - \dot{u}_{k-1}) + \frac{\partial f}{\partial d}\bigg|_{k,k}(d_k - d_k)$$

$$= F_k + A\tilde{x}_k + B\tilde{\dot{u}}_k + B_d\tilde{d}_k$$

where $F_k$ is the free response over one sample and $$F_k = f(x_k, \dot{u}_{k-1}, d_k) - x_k = x_{k+1}^- - x_k$$

For the states associated with engine dynamics and actuator dynamics where the state update is not explicitly dependent on the input, that is, there exist:

$$x_{k+1} = f(x_k, \dot{u}_k, d_k) = x_{k+1}^- = f(x_k, \dot{u}_{k-1}, d_k)$$

and $$x_k = f(x_{k-1}, \dot{u}_{k-1}, d_{k-1}) = x_k^- = f(x_{k-1}, \dot{u}_{k-2}, d_{k-1}).$$

Therefore, $$F_{e,k} = x_{e,k+1}^- - x_{e,k} = x_{e,k+1} - x_{e,k} \approx x_{e,k} - x_{e,k-1}$$

and $$F_{a,k} = x_{a,k+1}^- - x_{a,k} = x_{a,k+1} - x_{a,k} \approx x_{a,k} - x_{a,k-1}.$$

For integrators, $F_{i,k} = x_{i,k+1} - x_{i,k} = T_s \cdot \dot{u}_{R,k-1}$, where $T_s$ is the sampling time.

For the controlled outputs and constraints, $$y_k - y_{\bar{k}} = \tilde{y}_k$$

$$= \frac{\partial h}{\partial x}\bigg|_{k,k}(x_k - x_k) + \frac{\partial h}{\partial u}\bigg|_{k,k-1}(\dot{u}_k - \dot{u}_{k-1}) +$$

$$\frac{\partial h}{\partial d}\bigg|_{k,k}(d_k - d_k)$$

$$= Cx_k + D_u u_k + D_d \tilde{d}_k$$

-continued $$y_{c,k} - y_{\tau,k} = \tilde{y}_{c,k}$$
$$= \frac{\partial h_c}{\partial x}\bigg|_{k,k}(x_k - x_k) + \frac{\partial h_c}{\partial u}\bigg|_{k,k-1}(u_k - u_{k-1}) +$$
$$\frac{\partial h_c}{\partial d}\bigg|_{k,k}(d_k - d_k)$$
$$= C_c x_k + D_{cu} u_k + D_{cd} \tilde{d}_k$$

Using the inputs of the integrators as the control inputs for the controlled plant, $D_u = 0$ and $D_{cu} = 0$ due to the increased relative degrees introduced by actuators and integrators. The state space perturbation model for the control system is:

$$\tilde{x}(k+1) = A\tilde{x}(k) + B\dot{\tilde{u}}(k) + B_d \tilde{d}(k) + F_k \quad \text{(Eq. 2a)}$$

$$\tilde{y}(k) = C\tilde{x}(k) + F_d \tilde{d}(k) \quad \text{(Eq. 2b)}$$

$$\tilde{y}(k) = C_c \tilde{x}(k) + D_{cd} \tilde{d}(k) \quad \text{(Eq. 2c)}$$

Note that by definition, $\tilde{x}(k) = 0$, $\tilde{d}(k) = 0$ and $\tilde{y}_c(k) = 0$. Let $d(k) - d(k-1) = \hat{d}(k)$ and allow the following approximations:

$$\tilde{d}(k+1) \approx \hat{d}(k)$$

$$\tilde{d}(k+2) \approx 2\hat{d}(k)$$

$$\tilde{d}(k+3) \approx 3\hat{d}(k)$$

Turning now to the control method and system, consider the primary decoupling control 34. Recall that the controlled outputs, y 24, 26 for the propeller speed and engine speed control include variables N2 (second controlled output 26) and Nx (first controlled output 24) each with relative degree 3. Therefore, $$\tilde{y}_{i,k} = C_i \tilde{x}_k + D_{di} \tilde{d}_k \quad \text{(Eq. 3)}$$

$$\tilde{y}_{i,k+1} =$$
$$C_i A \tilde{x}_k + C_i B \dot{\tilde{u}}_k + C_i B_d \tilde{d}_k + C_i F_k + D_{di} \tilde{d}_{k+1} = C_i F_k + D_{di} \tilde{d}_k$$

$$\tilde{y}_{i,k+2} = C_i A^2 \tilde{x}_k + C_i A B \dot{\tilde{u}}_k + C_i A B_d \tilde{d}_k + C_i B_d \tilde{d}_{k+1} +$$
$$D_{di} \tilde{d}_{k+2} + C_i (A + I) F_k$$
$$= C_i (A + I) F_k + (C_{iB_d} + 2D_{di}) \tilde{d}_k$$

$$\tilde{y}_{i,k+3} = C_i A^3 \tilde{x}_k + C_i A^2 B \dot{\tilde{u}}_k + C_i A^2 B_d \tilde{d}_k + C_i A B_d \tilde{d}_{k+1} +$$
$$C_i B_d \tilde{d}_{k+2} + D_{di} \tilde{d}_{k+3} + C_i (A^2 + A + I) F_k$$
$$= E_i \dot{\tilde{u}}_k + (C_i A B_d + 2 C_i B_d + 3 D_{di}) \tilde{d}_k + C_i (A^2 + A + I) F_k$$
$$= K_{px} F_k + E_i \dot{\tilde{u}}_k + K_{pd} \hat{d}_k$$

This is, $$\tilde{y}_{i,k+3} = K_{px} F_k + E\dot{\tilde{u}}_k + K_{pd} \hat{d}_k \quad \text{(Eq. 4)}$$

The input-output mapping or decoupling matrix between the control inputs and controlled outputs is:

$$E = \begin{bmatrix} C_1 A^2 B \\ C_2 A^2 B \end{bmatrix} = \begin{bmatrix} e_{11} & e_{12} \\ e_{21} & e_{22} \end{bmatrix}$$

By introducing the pseudo-input $\dot{v}$ 30, 32 and letting $\tilde{y}_{i,k+3} = \dot{v}_i$, the input-output relation is to be shaped into the desired dynamics in the continuous-time domain as:

$$\frac{\tilde{y}_i}{\dot{v}_i} = \frac{1}{s \cdot (T_{pd1,i} s + 1) \cdot (T_{pd2,i} s + 1)}$$

Equivalently, in the discrete-time domain with sampling time, $T_s$:

$$\frac{\tilde{y}_i(z)}{\dot{v}_i(z)} = \left(\frac{1 - \lambda_{pd1,i}}{z - \lambda_{pd1,i}}\right)\left(\frac{1 - \lambda_{pd2,i}}{z - \lambda_{pd2,i}}\right)\left(\frac{T_s}{z-1}\right), \quad \text{(Eq. 5)}$$

$$\lambda_{pd1,i} = e^{-\frac{T_s}{T_{pd1,i}}},$$

$$\lambda_{pd2,i} = e^{-\frac{T_s}{T_{pd2,i}}}, \text{ and}$$

$$\tilde{y}_{i,k+3} - (1 + \lambda_{pd1,i} + \lambda_{pd2,i}) \tilde{y}_{i,k+2} + \quad \text{(Eq. 5)}$$
$$(\lambda_{pd1,i} \lambda_{pd2,i} + \lambda_{pd1,i} + \lambda_{pd2,i}) \tilde{y}_{i,k+1} -$$
$$\lambda_{pd1,i} \lambda_{pd2,i} \tilde{y}_{i,k} = \dot{v}_{i,k}(1 - \lambda_{pd1,i})(\lambda_{pd2,i}) T_s$$

Substituting for $\tilde{y}_{i,k+2}$, $\tilde{y}_{i,k+1}$ and $\tilde{y}_{i,k}$ in (Eq. 5), yields:

$$\tilde{y}_{i,k+3} = K_{pdv,i} \dot{v}_{i,k} + K_{pdx,i} F_k + K_{pdd,i} \hat{d}_k \quad \text{(Eq. 6)}$$

That is, $$\tilde{y}_{i,k+3} = K_{pdv} \dot{v}_k + K_{pdx} F_k + K_{pdd} \hat{d}_k \quad \text{(Eq. 7)}$$

Comparing (Eq. 7) to (Eq. 4) yields:

$$E\dot{\tilde{u}}_k + K_{pdv} \dot{v}_k + (K_{pdx} - K_{px}) F_k + (K_{pdd} - K_{pd}) \hat{d}_k \quad \text{(Eq. 8)}$$

Therefore, the primary decoupling control 34 is:

$$\dot{\tilde{u}}_k = E^{-1} K_{pdv} \dot{v}_k + E^{-1}(K_{pdx} - K_{px}) F_k + E^{-1}(K_{pdd} - K_{pd}) \hat{d}_k \quad \text{(Eq. 9)}$$
$$= K_V \dot{v}_k + K_X F_k + K_D \hat{d}_k$$
$$= K_V \dot{v}_k + K_X \hat{x}_k + K_D \hat{d}_k$$

Consequently, the decoupled controlled plant 28 is:

$$\tilde{x}(k+1) = A\tilde{x}(k) + BK_V \dot{v}(k) + BK_D \hat{d}(k) + BK_X F_X + \quad \text{(Eq. 10a)}$$
$$B_d \tilde{d}(k) + F_k$$
$$= A\tilde{x}(k) + B_N \dot{v}(k) + B_{dN} \hat{d}(k) + B_d \tilde{d}(k) + K_{bf} F_k$$

$$\tilde{y}(k) = C\tilde{x}(k) D_d \tilde{d}(k) \quad \text{(Eq. 10b)}$$

$$\tilde{y}_c(k) = C_c \tilde{x}(k) D_{cd} \tilde{d}(k) \quad \text{(Eq. 10c)}$$

When the PCM pitch angle 22 needs to follow a scheduled pitch angle reference 36, for example, in a thrust reverse operation (as shown in FIG. 1B), the primary decoupling control 34 performs an online reconfiguration to reduce to a lower order system. From the original 2×2 primary decoupling control 34, $E\dot{\tilde{u}}_k = K_{pdv} \dot{v}_k + (K_{pdx} - K_{px}) F_k + (K_{pdd} - K_{pd}) \hat{d}_k = M_{p,k}$, or, more compactly, $$\begin{bmatrix} e_{11} & e_{12} \\ e_{21} & e_{22} \end{bmatrix} \begin{bmatrix} \dot{\tilde{u}}_{1,k} \\ \dot{\tilde{u}}_{2,k} \end{bmatrix} = \begin{bmatrix} M_{p,k}(1) \\ M_{p,k}(2) \end{bmatrix},$$

the system separates $\dot{u}_2$ term, alternatively known as u2dot 38, from the controlled plant 28 and treats u2dot 38 as a known disturbance input. Consequently, the system transforms the original 2×2 control into a 1×1 control for N2 (second controlled output 26) and Nx (first controlled output 24), respectively, $$\text{i.e.} \begin{bmatrix} e_{11} \\ e_{21} \end{bmatrix} [\tilde{\dot{u}}_{1,k}] = \begin{bmatrix} M_{p,k}(1) \\ M_{p,k}(2) \end{bmatrix} - \begin{bmatrix} e_{12} \\ e_{22} \end{bmatrix} [\tilde{\dot{u}}_{2,k}]$$

where the PCM pitch angle (BetaP) 22 determines $\tilde{\dot{u}}_{2,k}$ (i.e. $\tilde{\dot{u}}_{2,k}$ follows the reference schedule provided by BetaP).

In this way, BetaP 22 does not serve as a speed tracking control input. Instead, the control system treats BetaP as a known disturbance for speed tracking Therefore, the system includes only one control input, fuel flow (Wf) 20 from the fuel actuator, to serve the two controlled outputs 24, 26.

Consequently, the control system 12 may then instantiate a compromise for tracking the two controlled speed outputs 24, 26 (i.e. N2 and Nx) by one control input (Wf). The control system 12 may select the most demanding $\tilde{\dot{u}}_{1,k}$ amongst $\tilde{\dot{u}}_{1,k}=(1/e_{11})[M_{p,k}(1)-e_{12}*\tilde{\dot{u}}_{2,k}]$ and $\tilde{\dot{u}}_{1,k}=(1/e_{21})[M_{p,k}(2)-e_{22}*\tilde{\dot{u}}_{2,k}]$ such that the most demanding speed tracking is satisfied and the other speed tracking is naturally fallout, and the $\tilde{\dot{u}}_{1,k}$ applies to two speed trackings proportionally corresponding to their dynamic relation inherited from the decoupling matrix E. The control system 12 may also apply a weighting factor to each of the two speed tracking outputs where the weighting factor is based on a relative priority of the two controlled outputs 24, 26 for the given operating condition. Alternatively, the control system 12 may control the higher priority speed tracking output with more effort whereby the lower priority output naturally falls out. Weighting factors add the flexibility to adjust the natural ratio, inherited from decoupling matrix E, of $\tilde{\dot{u}}_{1,k}$ proportionally acting on the two speed trackings for compensating potential model error in decoupling matrix E and addressing controlled outputs priority concern. Now the most demanding $\tilde{\dot{u}}_{1,k}$ is selected amongst the weighted $\tilde{\dot{u}}_{1,k}=(1/e_{11})[M_{pW,k}(1)-e_{12}*\tilde{\dot{u}}_{2,k}]$ and $\tilde{\dot{u}}_{1,k}=(1/e_{21})[M_{pW,k}(2)-e_{22}*\tilde{\dot{u}}_{2,k}]$.

Because the primary decoupling control 34 has decoupled the control plant 28 into two separate single-input single-output (SISO) control loops for N2 and NX and shaped their desired dynamics, respectively, the control system may include additional SISO lead/lag to enhance the N2 and NX tracking 40, 42 respectively, which may be expressed for v1dot 30 and v2dot 32 as:

$$\dot{v}_i = \frac{k_{pci}(1+\tau_{pci}s)}{1+T_{pci}s}(y_{Ri}-y_i) = \frac{k_{pci}(1+\tau_{pci}s)}{1+T_{pci}s}\hat{\tilde{y}}_i \quad \text{(Eq. 11)}$$

After decoupling the plant 28 and shaping its desired dynamics, the control system 10, 12 determines the controlled output tracking 40, 42 by the performance of the following SISO control relationship:

$$\frac{\tilde{y}_i}{\hat{\tilde{y}}_i} = \frac{1}{s\cdot(T_{pd1,i}s+1)\cdot(T_{pd2,i}s+1)}\cdot\frac{1+T_{pci}s}{k_{pci}(1+\tau_{pci}s)} \quad \text{(Eq. 12)}$$

The control system 10, 12 determines the first operand of the transfer function $$\left(\text{i.e.}\frac{1}{s\cdot(T_{pd1,i}s+1)\cdot(T_{pd2,i}s+1)}\right)$$

by the desired decoupled dynamics selection. The control system 10, 12 selects the second operand of the transfer function based on the desired output tracking.

Given $N_{2R}-N_2$ and $N_{xR}-N_x$, the primary control system includes known inputs $\dot{v}_1^{N_2}$ and $\dot{v}_2^{N_x}$.

Figure 2:
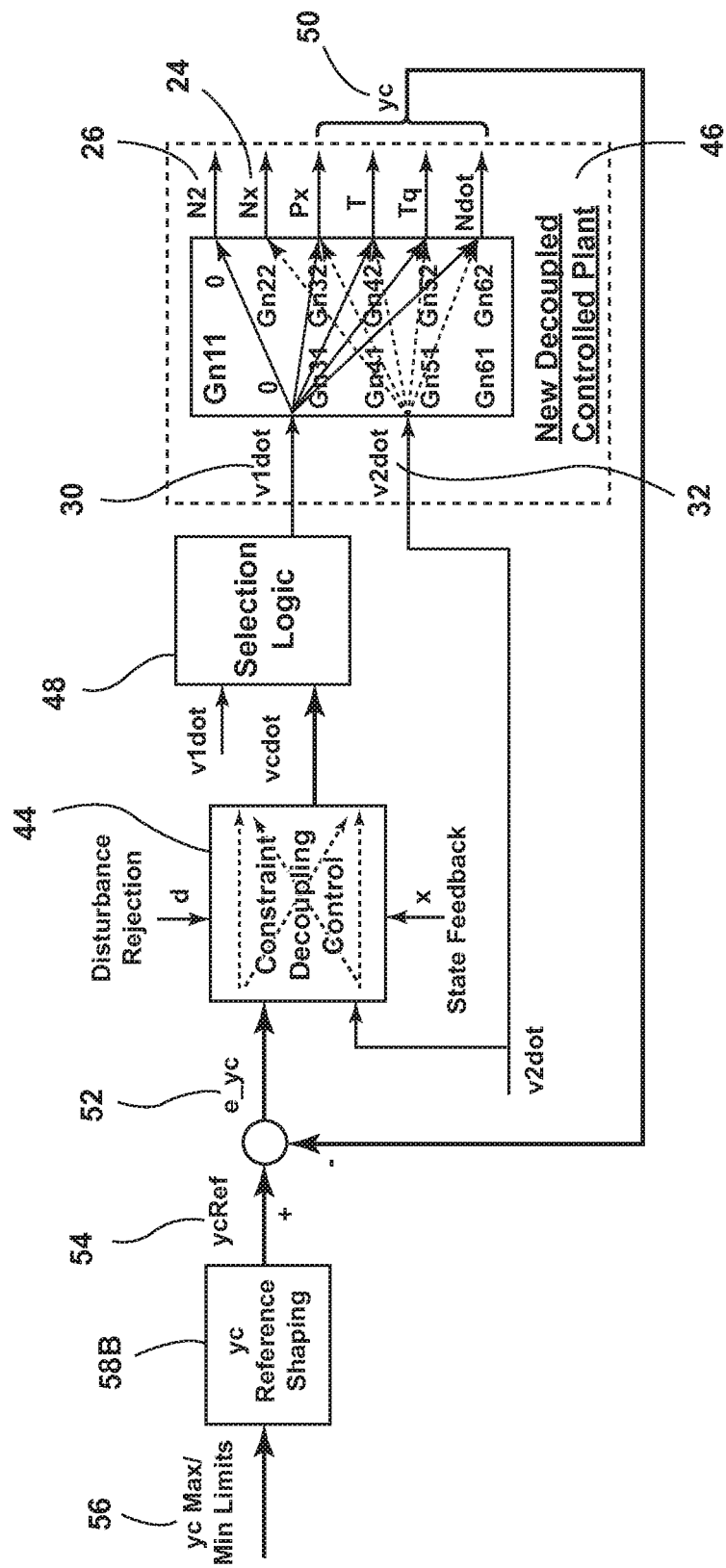
FIG. 2 is a block diagram representation of the constraint decoupling control architecture for a variable pitch fan engine or a turbo shaft turboprop engine.

Turning now to the constraints decoupling control 44 as presented in FIG. 2, the control system includes the assumption that all constraints have relative degree 2, without loss of generality, based on the decoupled control plant 46. The input-output mapping between the control pseudo-inputs (e.g. v1dot 30, v2dot 32) and all of the constraint outputs 50 may be expressed as:

$$\tilde{y}_{ci}(k) = C_{ci}\tilde{x}(k) + D_{cdi}\tilde{d}(k)$$

$$\tilde{y}_{ci,k+1} = C_{ci}A\tilde{x}_k + C_{ci}B_N\dot{v}_k + C_{ci}(B_{dN}\hat{d}_k + B_d\tilde{d}_k) +$$
$$C_{ci}K_{bf}F_k + D_{cdi}\hat{d}_{k+1}$$
$$= C_{ci}K_{bf}F_k + (C_{ci}B_{dN} + D_{cdi})\hat{d}_k$$

$$\tilde{y}_{ci,k+2} = C_{ci}A^2\tilde{x}_k + C_{ci}AB_N\dot{v}_k + C_{ci}AB_{dN}\hat{d}_k + C_{ci}AB_d\hat{d}_k +$$
$$C_{ci}(B_{dN}\hat{d}_{k+1} + B_d\hat{d}_{k+1}) + D_{cdi}\hat{d}_{k+2} + C_{ci}(A+I)K_{bf}F_k$$
$$= C_{ci}(A+I)K_{bf}F_k + E_{ci}\dot{v}_k + (C_{ci}B_{dN} + C_{ci}B_d +$$
$$2D_{cdi})\hat{d}_k$$
$$= C_{ci}(A+I)K_{bf}F_k + E_{ci}\dot{v}_k + (C_{ci}B_{dN} + C_{ci}B_d + 2D_{cdi})\hat{d}_k$$
$$= K_{cpxi}F_k + E_{ci}\dot{v}_k + K_{cpdi}\hat{d}_k$$

The input-output mapping matrix between the control pseudo-inputs (e.g. v1dot 30, v2dot 32) and constraint outputs 50 may be expressed as:

$$E_c = \begin{bmatrix} C_{C1}AB_N \\ C_{C2}AB_N \\ C_{C3}AB_N \\ C_{C4}AB_N \end{bmatrix} = \begin{bmatrix} e_{c11} & e_{c12} \\ e_{c21} & e_{c22} \\ e_{c31} & e_{c32} \\ e_{c41} & e_{c42} \end{bmatrix}$$

Consequently, $$\tilde{y}_{c,k+2} = K_{cpx}F_k + E_c\dot{v}_k + K_{cpd}\hat{d}_k \quad \text{(Eq. 13)}$$

The control system includes defining the constraint tracking error 52 as: $\hat{y}_{ci}(k+j)=y_{cri}(k+j)-y_{ci}(k)$, j=0, 1, 2. Note that the constraint reference 54 may be a maximum limit, a minimum limit or both.

The desired constraint tracking response for the control system may be expressed as:

$$(\hat{y}_{ci}(k+2)-\tilde{y}_{ci}(k+2))+k_{ci,1}(\hat{y}_{ci}(k+1)-\tilde{y}_{ci}(k+1))+k_{ci,0}(\hat{y}_{ci}(k)-\tilde{y}_{ci}(k))=0 \quad \text{(Eq. 14)}$$

The poles for the tracking dynamics may be set as $\lambda_{cd1}$ and $\lambda_{cd2}$ within the unit circle. Consequently, $$k_{ci,1}=-(\lambda_{cd1}+\lambda_{cd2}), k_{ci,0}=\lambda_{cd1}\cdot\lambda_{cd2} \quad \text{(Eq. 15)}$$

Substituting $\tilde{y}_{ci,k+1}$ into (Eq. 12) yields:

$$\tilde{y}_{ci,k+1} = C_{ci}A\tilde{x}_k + C_{ci}B_N\tilde{v}_k + C_{ci}(B_{dN}\hat{d}_k + B_d\tilde{d}_k) +$$
$$C_{ci}K_{bf}F_k + D_{cdi}\hat{d}_{k+1}$$
$$= C_{ci}K_{bf}F_k + (C_{ci}B_{dN} + D_{cdi})\hat{d}_k$$

$$\tilde{y}_{ci}(k+2) = [\hat{y}_{ci}(k+2) + k_{ci,1}\hat{y}_{ci}(k+1) + k_{ci,0}\hat{y}_{ci}(k)] -$$
$$[k_{ci,1}\hat{y}_{ci}(k+1) + k_{ci,0}\hat{y}_{ci}(k)]$$
$$= [\hat{y}_{ci}(k+2) + k_{ci,1}\hat{y}_{ci}(k+1) + k_{ci,0}\hat{y}_{ci}(k)] -$$
$$[k_{ci,1}\hat{y}_{ci}(k+1)$$
$$= [\hat{y}_{ci}(k+2) + k_{ci,1}\hat{y}_{ci}(k+1) + k_{ci,0}\hat{y}_{ci}(k)] -$$
$$k_{ci,1}C_{ci}K_{bf}F_k - k_{ci,1}(C_{ci}B_{dN} + D_{cdi})\hat{d}_k$$
$$= [\hat{y}_{ci}(k+2) + k_{ci,1}\hat{y}_{ci}(k+1) + k_{ci,0}\hat{y}_{ci}(k)] -$$
$$K_{cdxi}F_k - K_{cddi}\hat{d}_k$$

If the reference is constant, $\hat{y}_{ci}(k+2) = \hat{y}_{ci}(k+1) = \hat{y}\_ci(k)$ and:

$$\tilde{y}_{ci}(k+2) = [\hat{y}_{ci}(k+2) + k_{ci,1}\hat{y}_{ci}(k+1) + k_{ci,0}\hat{y}_{ci}(k)] - \quad \text{(Eq. 16)}$$
$$K_{cdxi}F_k - K_{cddi}\hat{d}_k$$
$$= (1 + k_{ci,1} + k_{ci,0})\hat{y}_{ci,k} - K_{cdxi}F_k - K_{cddi}\hat{d}_k$$
$$= k_{ci}\hat{y}_{ci,k} - K_{cdxi}F_k - K_{cddi}\hat{d}_k$$

That is, $$\tilde{y}_{c,k+2} = K_c\hat{y}_{c,k} - K_{cdx}F_k - K_{cdd}\hat{d}_k.$$

However, if the constraint reference 54 is time varying, $\hat{y}_{ci}(k+2) \neq \hat{y}_{ci}(k+1) \neq \hat{y}\_ci(k)$. The control system includes the assumption that the references changes linearly within 3 samples by defining $\hat{y}_{Rci,k} = y_{Rci}(k) - y_{Rci}(k-1)$, $y_{Rci}(k+1) = y_{Rci}(k) + \alpha\hat{y}_{Rci,k}$, and $y_{Rci}(k+2) = y_{Rci}(k) + 2\alpha\hat{y}_{Rci,k}$. Consequently, $$\tilde{y}_{ci}(k+2) = [\hat{y}_{ci}(k+2) + k_{ci,1}\hat{y}_{ci}(k+1) + k_{ci,0}\hat{y}_{ci}(k)] - \quad \text{(Eq. 17)}$$
$$K_{cdxi}F_k - K_{cddi}\hat{d}_k$$
$$= (2\alpha\hat{y}_{Rci,k} + k_{ci,1}\alpha\hat{y}_{Rci,k} + k_{ci,0})\hat{y}_{ci,k} -$$
$$K_{cdxi}F_k - K_{cddi}\hat{d}_k$$
$$= [(2\alpha + k_{ci,1}\alpha)\hat{y}_{Rci,k} + k_{ci}]\hat{y}_{ci,k} -$$
$$K_{cdxi}F_k - K_{cddi}\hat{d}_k$$

That is, $$\tilde{y}_{c,k+2} = K_c^*\hat{y}_{c,k} - K_{cdx}F_k - K_{cdd}\hat{d}_k.$$

In preferred embodiments of the control system, the control priority of Nx, 24 is greater than the control priority of N2 26, that is, N2 26 is the tradeoff target. Therefore, the control system may compare all the constraints and N2. The control system may then select the variable with the largest demand for $\dot{v}_1$, alternatively known as v1dot 30, as the new controlled output.

The constraint decoupling control 44 presented herein is applicable at least for variable pitch fan engines and turboshaft, turbo propeller engines. Other applications more generally include, but are limited to, open-rotor turbine engines. Note that when Nx 24 is controlled by v2dot 32 alone, the ith constraint input-output mapping may be expressed as $\hat{y}_k = e_{ci,1}\dot{v}_1(k) + e_{ci,2}\dot{v}_2(k)$. The term $\dot{v}_2(k)$ (e.g. v2dot 32) determined by tracking Nx 24 is a known input for any of the constraints and noted as $\dot{v}_{2,k}^{Nx}$.

The control system includes the constraint decoupling control 44 derived by comparing (Eq. 13) and (Eq. 17):

$$E_c\dot{v}_k = K_c^*\hat{y}_{c,k} - (K_{cdx} + K_{cpx})F_k - (K_{cdd} + K_{cpd})\hat{d}_k \quad \text{(Eq. 18)}$$
$$= K_c^*\hat{y}_{c,k} - K_{cx}F_k - K_{cd}\hat{d}_k$$
$$= K_c^*\hat{y}_{c,k} - K_{cx}\hat{x}_k - K_{cd}\hat{d}_k = M_{cp,k}$$

Alternatively, $$\begin{bmatrix} e_{c11} & e_{c12} \\ e_{c21} & e_{c22} \\ e_{c31} & e_{c32} \\ e_{c41} & e_{c42} \end{bmatrix} \begin{bmatrix} \dot{v}_{1,k} \\ \dot{v}_{2,k} \end{bmatrix} = \begin{bmatrix} M_{cp,k}(1) \\ M_{cp,k}(2) \\ M_{cp,k}(3) \\ M_{cp,k}(4) \end{bmatrix}$$

and $$\begin{bmatrix} e_{c11} \\ e_{c21} \\ e_{c31} \\ e_{c41} \end{bmatrix} [\dot{v}_{1,k}] = \begin{bmatrix} M_{cp,k}(1) \\ M_{cp,k}(2) \\ M_{cp,k}(3) \\ M_{cp,k}(4) \end{bmatrix} - \begin{bmatrix} e_{c12} \\ e_{c22} \\ e_{c32} \\ e_{c42} \end{bmatrix} [\dot{v}_{2,k}]$$

For each constraint tracking, the control system calculates the demanded $\dot{v}_{ci,1}(k)$ as:

$$\dot{v}_{ci,1}(k) = (e_{ci1})^{-1}[M_{cp,k}(i) - e_{ci2}\dot{v}_{2,k}^{Nx}] \quad \text{(Eq. 19)}$$

Given the constraints, expressed as minimum and maximum limits 56, minimum pressure limit (MinPx), maximum pressure limit (MaxPx), maximum temperature limit (MaxT), maximum torque limit (MaxTq), minimum speed rate limit (MinN2dot), and maximum speed rate limit (MaxN2dot), the control system includes the following relationships:

MaxPx requests $\dot{v}_{c1,1}^+ = (e_{c11})^{-1}[M_{cp,k}^+(1) - e_{c12}\dot{v}_{2,k}^{Nx}]$;

MinPx requests $\dot{v}_{c1,1}^- = (e_{c11})^{-1}[M_{cp,k}^-(1) - e_{c12}\dot{v}_{2,k}^{Nx}]$;

MaxT requests $\dot{v}_{c2,1}^+ = (e_{c21})^{-1}[M_{cp,k}^+(2) - e_{c22}\dot{v}_{2,k}^{Nx}]$;

MaxTq requests $\dot{v}_{c3,1}^+ = (e_{c31})^{-1}[M_{cp,k}^+(3) - e_{c32}\dot{v}_{2,k}^{Nx}]$;

MaxN2dot requests $\dot{v}_{c4,1}^+ = (e_{c41})^{-1}[M_{cp,k}^+(4) - e_{c42}\dot{v}_{2,k}^{Nx}]$; and MinN2dot requests $\dot{v}_{c4,1}^- = (e_{c41})^{-1}[M_{cp,k}^-(4) - e_{c42}\dot{v}_{2,k}^{Nx}]$.

Each constraint tracking is embedded in the constraint decoupling control 44 described above.

The control system's selection logic 48 determines the most demanding output among all the control constraints outputs 50 and N2 26. Then the control system selects the pseudo-input $\dot{v}$ (e.g. v1dot 30, v2dot 32) requested by the most demanding output (e.g. any of the control constraints 50 or N2 and assigns that pseudo-input to be v1dot.

The control reference shaping 58 is for both primary control references (i.e. primary control reference shaping 58A) and constraint control references (i.e. constraint control reference shaping 58B). In general, the control reference shaping 58 fits a reference into one or more desired trajectories. Control reference shaping 58 performs functions related to reference rate scheduling and reference coordination, filtering, and reference prediction action.

As contemplated herein for use with the control system, primary control reference shaping 58A functions for reference rate scheduling and reference coordination for N2 and Nx references based on thrust forward operation or thrust reverse operation, and the transition associated between the two operations. For constraint references, constraint control reference shaping 58B provides reference prediction based on the known information of the constant or varying constraint limits. For example, MinPx, MaxPx, MaxT, and MaxTq may be constant limits, MaxN2dot and MinN2dot may be varying limits, and MaxN2dot and MinN2dot may be continuous variables. Therefore, it is contemplated that the control system includes the prediction of the N2dot limits to be linear extensions of the current N2dot limit rate over the samples within the relative degree of N2dot.

Figure 1C:
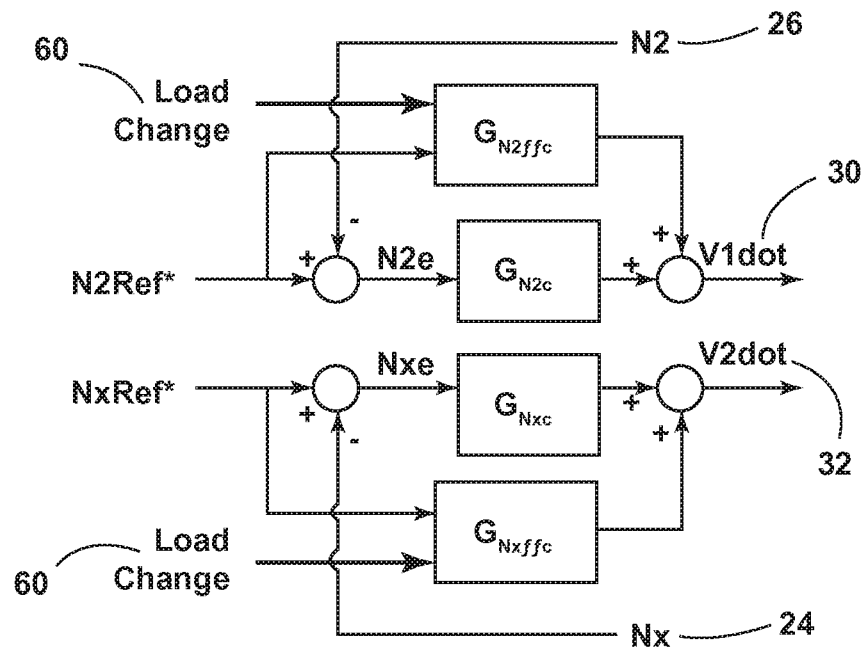
FIG. 1C shows block diagram representations of feed-forward control actions for a primary control architecture for a variable pitch fan engine or a turbo shaft turboprop engine.
Figure 1C:
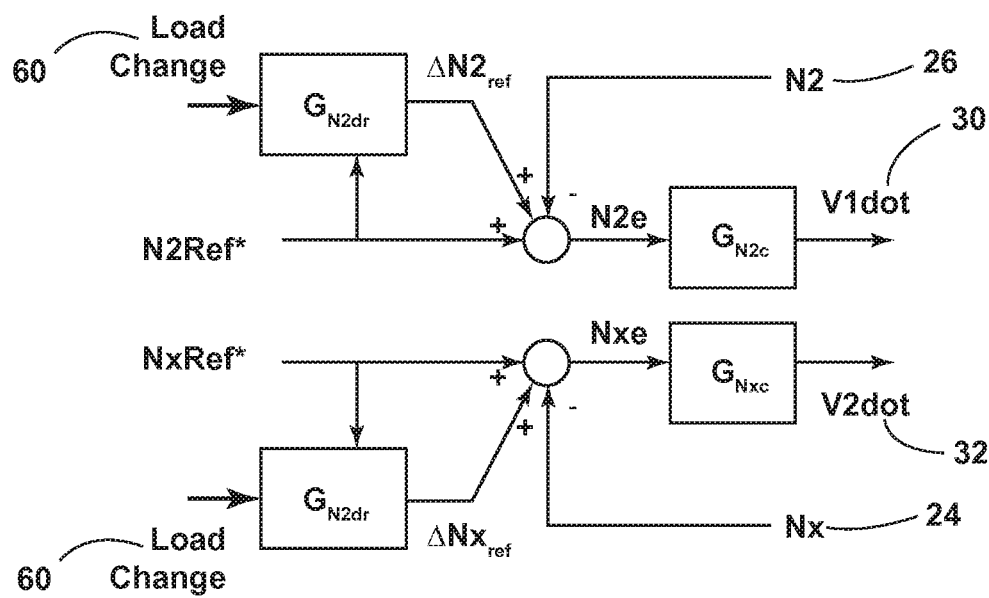

In general, if control reference shaping robustly and accurately manages the reference change rates, all the references are properly coordinated, and the feedback control has proper bandwidth, then a feedforward control action is not necessary. However, when the external disturbances are significant, the control system may include a feedforward control action as shown in FIG. 1C to enhance the control system bandwidth while rejecting external disturbances.

Figure 1D:
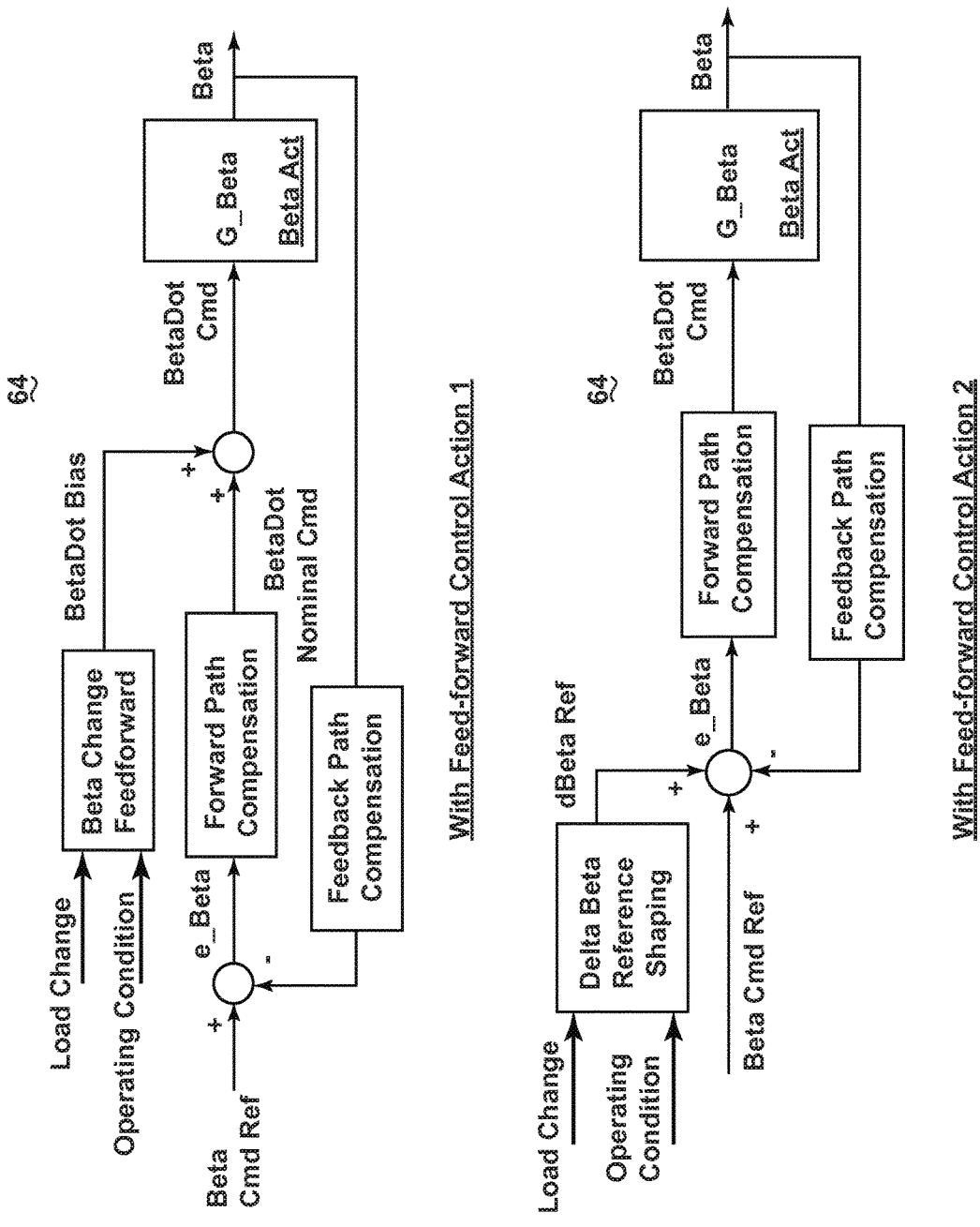
FIG. 1D shows block diagram representations of the pitch angle servo control for a primary control architecture for a variable pitch fan engine or a turbo shaft turboprop engine.
Figure 1E:
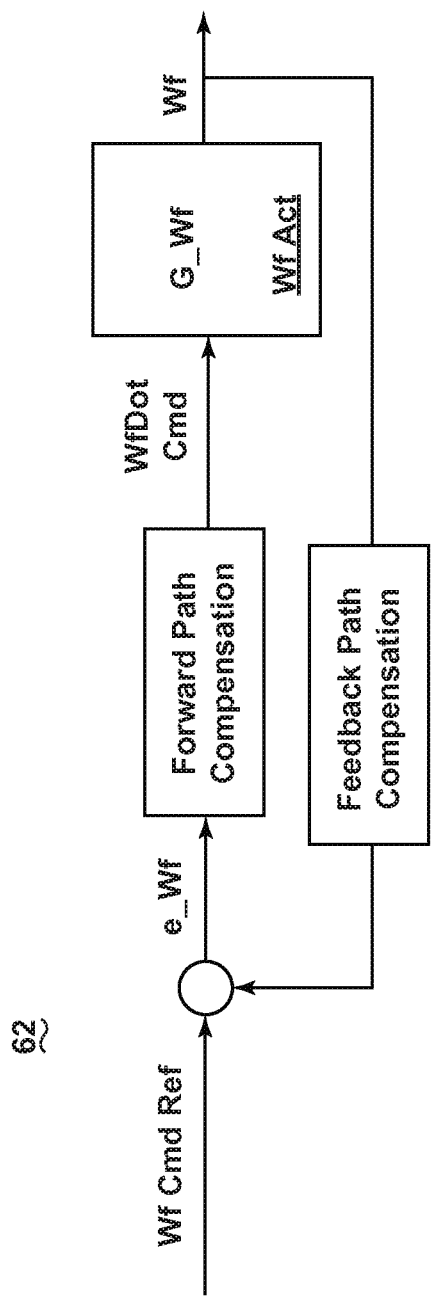
FIG. 1E is a block diagram representation of the engine fuel flow servo control for a primary control architecture for a variable pitch fan engine or a turbo shaft turboprop engine.

In the presently disclosed control system, the feedforward control action operates to effectively consider the impact of changes to the aerodynamic load 60 on the control system 10, 12. Significant changes to the aerodynamic load 60 may result in changes to the aircraft's speed and propeller blade pitch angle. The changes to the aerodynamic load 60 may be known in advance as scheduled, or the control system may estimate the load change by, for example, a torque sensor measurement with consideration of the aerodynamic delay and mechanical transport delay. The control system may map the load change to a corresponding reaction change in speed and blade pitch angle and incorporate the adjustments in an issued request for actuator control commands. In this way, the control system responds to the load changes more responsively while tracking the speed references. The integration of control elements for both forward path compensation and feedback path compensation as well as feedforward control action for the PCM pitch angle servo control 64 is shown in FIG. 1D. The integration of control elements for both forward path compensation and feedback path compensation for the fuel flow servo control 62 is shown in FIG. 1E.

Figure 3:
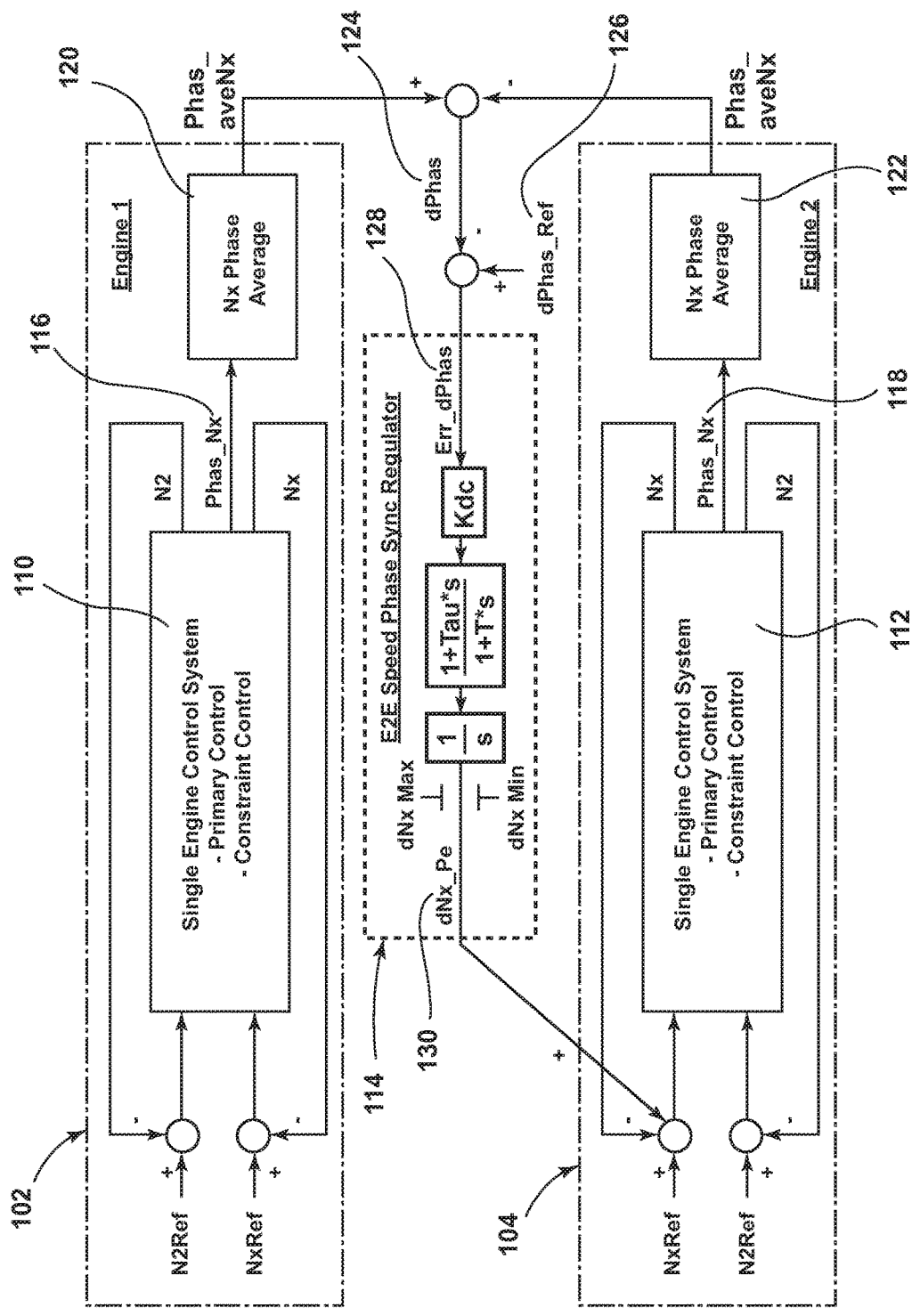
FIG. 3 is a block diagram representation of the engine-to-engine speed phase synchronization architecture for an aircraft with multiple variable pitch fan engines or turbo shaft turboprop engines.

Referring now to FIG. 3, for an aircraft with multiple engines 102, 104 where each engine operates with its own control system 110, 112, the control systems 110, 112 and a speed phase synchronization regulator 114 perform the engine-to-engine speed phase synchronization (i.e. the relative rotational position of the propellers) by a series of control steps. Each engine control system 110, 112 measures the propeller speed phase 116, 118 and broadcasts a filtered phase signal 120, 122 to one or more of the other engine control systems. Each engine control system includes a speed phase synchronization regulator. One engine 102 is specified to be the master and the second engine 104 is specified as the slave. Each engine control system receives the phase signals from other engines and the master engine ID via data bus. Each control system of slave engines calculates the difference of the speed phase signals 124 by comparing the speed phase signal from the master engines 102 with the speed phase signal from the slave engine itself 104 and then compares the difference with a phase difference reference 126 (in general it is zero) to generate a phase difference error 128. The phase difference error 128 is sent to the speed phase synchronization regulator 114 and the speed phase synchronization regulator 114 calculates a speed reference bias 130. The control system adds the speed reference bias 130 to the slave engine propeller speed reference such that the slave engine speed phase is synchronized to the master engine speed phase.

The control system described above treats the fan or propeller and the gas engine as one controlled plant and includes all the outputs and constraints to be controlled, considers known disturbances rejection, and covers the operational conditions where large changes occur in the reference schedules. Consequently, the technical benefits include a complete, systematic but simple method and system as a holistic and separatable solution for the control of variable pitch fan engines, and turbo-shaft turbo-propeller engines, including ducted and unducted variable pitch fan engines, and turbo-shaft turbo-propeller engines.

It is to be understood the control system architectures disclosed herein may be provided in any manner known to those of ordinary skill, including software solutions, hardware or firmware solutions, and combinations of such. Such solutions would incorporate the use of appropriate processors, memory (and software embodying any algorithms described herein may be resident in any type of non-transitory memory), circuitry and other components as is known to those of ordinary skill.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A control system for an aircraft engine comprising a gas turbine driving a fan propeller with a mechanical gear-train and a dedicated pitch change mechanism for the fan propeller, the control system comprising:
   a fuel flow signal input;
   a pitch change mechanism signal input;
   at least one constraint input;
   a controlled plant for relating a pitch change mechanism pitch angle (BetaP) from the pitch change mechanism signal input and a fuel flow (Wf) from the fuel flow signal input and a constraint from the at least one constraint input to at least two controlled outputs, wherein a first one of the controlled outputs is either propeller speed (Nr) or power turbine shaft speed (N1) and a second one of the controlled outputs is engine core speed (N2), engine pressure ratio (EPR) or engine torque (Tq); and
   a decoupling control for decoupling one of the controlled plant and the at last one constraint into two separate single-input single-output (SISO) control loops for the first and second controlled outputs;
   a decoupling control for decoupling constraints from the decoupled controlled outputs and the constraints from one another such that each of constraints is separated into a SISO control loop;
   wherein the gas turbine and the fan propeller are coordinately controlled while coordinately controlling the constraints and the outputs, wherein the constrain input is at least one of core speed rate, core pressure, exhaust temperature and engine torque.

2. The control system of claim 1 wherein the fan propeller is parallel to the axis of the gas turbine.

3. The control system of claim 2 wherein the aircraft engine is an unducted single fan engine.

4. The control system of claim 1 wherein the aircraft engine is a turbo shaft, turbo propeller engine.

5. The control system of claim 1 further comprising a control for measuring a propeller speed phase to be transmitted to a speed phase synchronization and a control for receiving and adding a speed reference bias to a propeller speed reference to synchronize the aircraft engine with a second aircraft engine.

6. The control system of claim 1 wherein the decoupling control includes at least one known disturbance input.

7. The control system of claim 6 wherein the pitch change mechanism pitch angle (BetaP) is treated as a known disturbance input and the decoupling control is reconfigured to have a single controlled input based on the fuel flow (Wf).

8. The control system of claim 1 wherein the fan propeller is variable pitch.

9. A method of controlling an aircraft engine comprising a gas turbine driving a fan propeller with mechanical geartrain, and a fuel actuator, a pitch change mechanism actuator, the method comprising:
receiving a fuel flow signal;
receiving a pitch change mechanism signal; receiving at least on constrain input
relating in a controlled plant a pitch change mechanism pitch angle (BetaP) from the pitch change mechanism signal and a fuel flow (Wf) fuel flow signal to at least two controlled outputs, wherein a first one of the controlled outputs is either propeller speed (Nr) or power turbine shaft speed (N1) and a second one of the controlled outputs is engine core speed (N2), engine pressure ratio (EPR) or engine torque (Tq);
decoupling the controlled plant into two separate single-input single-output (SISO) control loops for the first and second controlled outputs; and
decoupling the constraints from the decoupled controlled outputs and the constraints from one another for coordinately controlling the constraints and the outputs, wherein the constrain input is at least one of core speed rate, core pressure, exhaust temperature and engine torque.

10. The method of claim 9 wherein the aircraft engine comprises a pitch change mechanism actuator, and further including receiving a pitch change mechanism signal and relating in the controlled plant a pitch change mechanism pitch angle (BetaP) from the pitch change mechanism signal to at least two controlled outputs, wherein a first one of the controlled outputs is either propeller speed (Nr) or power turbine shaft speed (N1) and a second one of the controlled outputs is engine core speed (N2), engine pressure ratio (EPR) or engine torque (Tq).

11. The method of claim 9 further including a step of rejecting known disturbances in the decoupling step.

12. The method of claim 11 further including a step of reconfiguring a decoupling control to have a single controlled input based on the fuel flow (Wf) and treating the pitch change mechanism pitch angle (BetaP) as a known disturbance input.

13. The method of claim 9 further including at least a feedforward control action of compensating the load change effect on engine speed and fan propeller rotor speed control based on load change indication or load change estimation.

\* \* \* \* \*